United States Patent [19]
Kramer

[11] Patent Number: 5,108,848
[45] Date of Patent: Apr. 28, 1992

[54] VEHICLE BATTERY

[76] Inventor: Jeff J. Kramer, 2501 45th St., Des Moines, Iowa 50310

[21] Appl. No.: 487,738

[22] Filed: Mar. 1, 1990

[51] Int. Cl.[5] ............................................. H07M 16/00
[52] U.S. Cl. .......................................... 429/9; 429/48
[58] Field of Search ..................................... 429/79, 48

[56] References Cited

U.S. PATENT DOCUMENTS

| | | |
|---|---|---|
| 2,044,917 | 6/1936 | Richardson . |
| 2,242,009 | 3/1966 | Schilke .................................... 429/9 |
| 2,629,059 | 2/1953 | Baumheckel . |
| 2,729,750 | 1/1956 | Draper et al. . |
| 3,129,372 | 4/1964 | Warren . |
| 3,200,014 | 8/1965 | Roberts . |
| 3,475,221 | 10/1969 | Jordan et al. ........................... 429/9 |
| 3,758,345 | 9/1973 | Toth . |
| 4,336,485 | 6/1982 | Stroud ................................... 320/15 |
| 4,564,797 | 1/1986 | Binkley .................................. 320/2 |
| 4,684,580 | 8/1987 | Cramer .................................. 429/9 |
| 4,770,954 | 9/1988 | Noordenbos ........................... 429/9 |
| 4,794,058 | 12/1988 | Thiess .................................. 429/116 |
| 4,983,473 | 1/1991 | Smith .................................... 429/48 |

OTHER PUBLICATIONS

*Popular Science*, Dec., 1989, "Back-Up Battery", p. 73.
*Quad-City Times*, Saturday, Aug. 19, 1989, "New Battery Has Built-In Rechargeable Spare to Save Forgetful Drivers".

Primary Examiner—Stephen Kalafut
Attorney, Agent, or Firm—Zarley, McKee, Thomte, Voorhees & Sease

[57] ABSTRACT

An improved vehicle battery providing a constant source of reserve electrical power. The primary source of electrical power is contained within a housing and is connectable to an electrical load. The reserve battery is also contained within the housing and is selectably connectable in parallel to the primary battery by a switch or relay. The reserve battery is of at least equal electrical power to that of the primary battery. Therefore, an adequate reserve is always maintained, even for adverse and extreme conditions that would be too much for smaller reserve batteries, but includes circuitry to disallow discharging of the reserve battery unless it is connected in parallel to the primary battery.

9 Claims, 2 Drawing Sheets

VEHICLE BATTERY

BACKGROUND OF THE INVENTION

1. Field of the Invention

The present invention relates to vehicle batteries, and in particular, to a battery for vehicles such as automobiles and the like which has constantly available reserve power.

2. Problems in the Art

Conventional automobile batteries, for example, include a fairly standard sized rectangular casing inside of which are positioned cells (six for 12 volt batteries—three for 6 volt batteries). The cells each contain positive and negative battery plates and appropriate electrolytic fluid to allow the battery to produce, store, and recharge electrical power. The operation of a conventional battery is well known within the art and will not be explained further at this point. Normal automobile batteries are rated between approximately 300 amps cranking power for the weakest batteries up to 800 or 900 amps for the most powerful.

Conventional battery technology has improved considerably in the last two decades. Conventionally sized automobile batteries have increased power, increased life, better response to discharge and recharge, and less maintenance than predecessors. This allows improved starting, as well prolonged operation of electrical equipment and auxiliary equipment with the automobile battery.

A significant problem still exists, however. If for any reason the conventional automobile battery loses power or is discharged, the needed source for electrical power is lost. There are no alternatives other than to jump-start the automobile or to restore or replace the battery.

The examples of situations where this scenario occurs are legion. If automobile lights are left on for extended periods of time without the car running, discharge of the battery is inevitable. If other auxiliary equipment such as radios, fans, or the like are left on without the engine running, similar problems can occur. Electrical shorts or bad connections to the battery, so that it does not recharge during use, are other types of problems where failure of the battery leaves the vehicle basically helpless.

Another common example is the diminishment of power output of a battery in extremely cold temperatures. In very cold conditions, even a fully charged battery in a car without any electrical problems may not be able to start the car.

Other problems that come with reliance on a single battery are well known. Despite these problems, conventional batteries are almost universally utilized. Some exotic attempts have been made to solve this problem but none have been accepted or apparently are satisfactory.

One example is the mounting of two conventional batteries in one automobile. When reserve power is needed, the second battery can be connected into the electrical system.

The problems with this system are very clear cut. The system doubles the cost for battery power, utilizes twice the space, which many times precludes such a system being used, and requires additional needed hardware, such as connecting wiring, switches, and additional mounting structure.

Other exotic attempts are exemplified in such issued patents as follows:

| U.S. PAT. NO. | INVENTOR | ISSUE DATE |
|---|---|---|
| 2,044,917 | Richardson | Jun. 23, 1936 |
| 2,629,059 | Baumheckel | Feb. 17, 1953 |
| 2,729,750 | Draper et al. | Jan. 3, 1956 |
| 3,129,372 | Warren | Apr. 14, 1964 |
| 3,200,014 | Roberts | Aug. 10, 1965 |
| 3,758,345 | Toth | Sep. 11, 1973 |
| 4,336,485 | Stroud | Jun. 22, 1982 |
| 4,564,797 | Binkley | Jan. 14, 1986 |
| 4,684,580 | Cramer | Aug. 4, 1987 |
| 4,794,058 | Thiess | Dec. 27, 1988 |

The Baumheckel, Warren, Draper and Stroud patents utilize two separate batteries which are interconnected or switchable. Thiess describes a portable reserve battery canister which can be plugged into the automobile's electrical system through the cigarette lighter plug.

Toth, Binkley, Richardson, and Roberts disclose battery having sub-parts. In Toth, each sub-part has its own terminals. In Roberts, the auxiliary battery includes compartments to separate the electrolytic solution from the plates until it is needed. Cramer has a large and small portion, the small portion is connected to the large when further power is needed. Binkley actually has three different sub-portions, two are which substantially smaller than the first, all of which are connected to a rather complex circuitry from which selection of electrical power can be made.

In all of these examples, either rather complex structure is required for the battery itself, or its circuitry; or the reserve units are all substantially smaller than the primary or main battery unit.

The obvious advantages of having reserve electrical power in an automobile battery can easily be appreciated. It eliminates the need to jump-start the vehicle, or try to reach some assistance when the primary battery will not suffice. It also eliminates the danger of trying to jump-start an automobile, where there is the potential for electrical sparking and explosion. Considerations of both safety and security exist when the car will not start and assistance to jump-start must be sought out. Time is also an important element. Re-charging a battery can take significant amounts of time, if it is even possible.

Additionally, reserve power allows the automobile to be operated even when the main battery is discharged or incapacitated. Thus, when the main portion is not usable, the reserve portion can be utilized until a replacement can be conveniently obtained for the entire battery.

Even with the existing attempts to provide readily available reserve power in an automobile battery, there is still room for improvement. As previously mentioned, many of the batteries are not conventionally shaped and therefore would not be readily adaptable to use universally in existing automobiles. Additionally, it is not seen in these prior attempts that the reserve power is necessarily sufficient to truly be reliable in all situations. These types of problems generally exist for most types of vehicle batteries, for instance, with respect to cars, trucks, tractors, etc.

For example, systems which have small auxiliary or reserve batteries may or may not be functional in extremely cold weather which affects all portions of the battery or batteries. Additionally, most automobiles do not require very much electrical power to start in normal conditions, and certainly do not require very much electrical power during operation, as that is generally supplied by the alternator or other electrical power producing device, or at least the battery is being constantly recharged.

It is therefore a primary object of the present invention to provide an improved vehicle battery which solves or improves over the problems and deficiencies in the art.

Another object of the present invention is to provide an improved vehicle battery which is generally universally installable in place of a conventional automobile battery.

Another object of the present invention is to provide an improved vehicle battery which contains sufficient reserve electrical power for most, if not all, situations, even in worst case type scenarios such as extremely cold weather.

A further object of the present invention is to provide an improved vehicle battery which provides always available, easy and virtually instantaneous access to reserve power.

A still further object of the invention is to provide an improved vehicle battery which is simple in construction, does not require substantial and costly structure, circuitry, or other components, and which is economical to manufacture and use.

Another object of the present invention is to provide an improved vehicle battery which is efficient, durable, and reliable.

These and other objects, features, and advantages of the present invention will become more apparent with reference to the accompanying specification and claims.

SUMMARY OF THE INVENTION

The present invention presents a battery which can be easily substituted for most conventional vehicle batteries. It contains, however, an always available reserve electrical power source which can be selectively used. The reserve power source also is isolated from use until specifically connected.

A housing of a conventional size contains first and second battery means. The first battery means is the primary electrical power source and includes terminals to connect it to the vehicle's electrical circuitry.

The second battery means is a similar voltage electrical storage battery but has at least 50% (fifty percent) of the total amount of electrical power stored in the primary or first battery means combined. Generally this requires the reserve battery means to physically be equal to or larger than the primary or first battery means, but both must be contained within the conventionally sized housing.

Connection means, either internal or external to the housing, provide switchable connection of the two battery means. Also, electrical components are utilized to ensure that electrical current cannot leave the reserve battery until it is hooked up with the primary battery, but allowing it to be kept at full charge when on reserve.

The invention therefore provides a direct substitute for conventional batteries with a primary battery having enough power to carry out required operations of the vehicle in most situations. When, however, the power is lost or additional power is needed, the reserve battery can be connected in parallel to the primary battery by operation of the switch. This can be either manual or automatic. One configuration for automatic switching is when a vehicle such as a car is started. The ignition switch could trigger the connection of the two batteries to always provide combined 100 percent starting power, and then disconnect the batteries and rely on just the primary battery for normal operation.

If the primary battery discharges or is run down and cannot accomplish its functions, an override switch, either on the battery housing or remotely mounted can tap into the reserve power.

The method of the invention utilizes the concept of incorporating two battery compartments within a standard sized housing, but configuring the reserve battery to be equal to or larger than the primary battery for the reasons expressed above.

A number of optional features or alternatives can be utilized with the invention to enhance its advantages. It can therefore can be seen that at least all the stated objectives have been met by the present invention.

DETAILED DESCRIPTION OF THE PREFERRED EMBODIMENT

Figure 1:
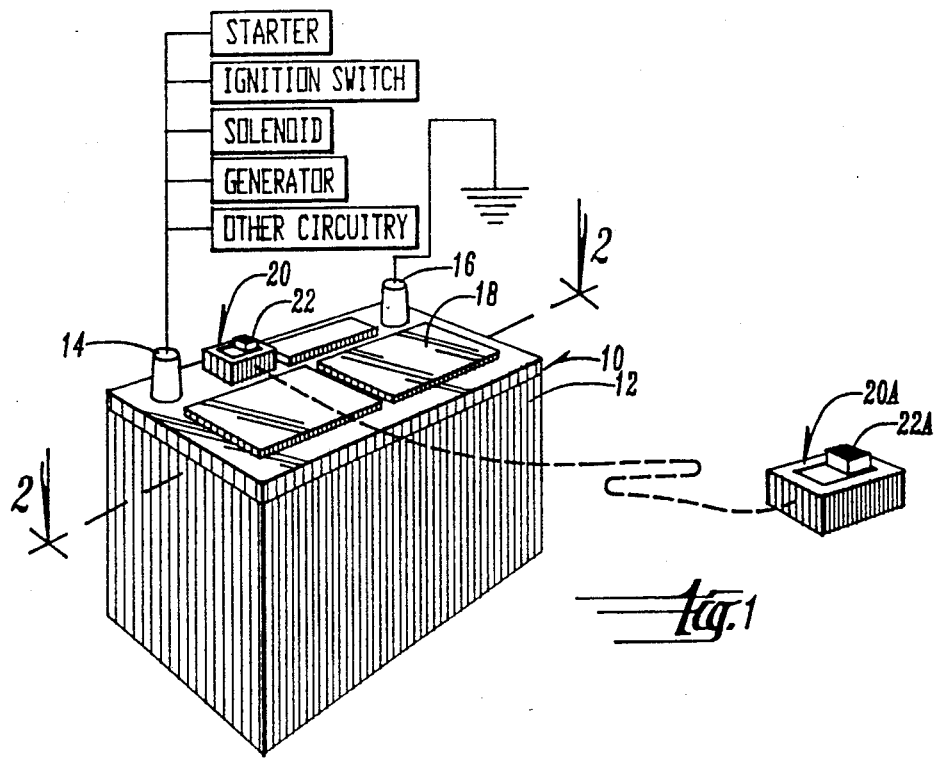
FIG. 1 is a perspective view of one embodiment of the invention including certain circuitries shown schematically attached to it.

With particular reference to the drawings, a detailed description of the preferred embodiments of the present invention will now be described. This description is intended to aid in an understanding of the invention, but is not intended, nor does it specifically limit the invention.

Reference numerals are utilized in the drawings to designate indicated elements or locations in the drawings. Like reference numerals will be used for like parts or locations throughout the drawings unless otherwise indicated.

With particular reference to FIG. 1, an improved battery 10 according to the present invention is shown. Battery 10 in the preferred embodiment is a 12 volt D.C. automobile battery, but it is to be understood that the invention applies equally as well to analogous types of batteries for analogous types of uses or vehicles. A housing 12 of conventional rectangular dimensions surrounds the electrical power storage compartments contained therein. Positive and negative terminals 14 and 16 are operatively connected to housing 12. Access doors 18 to the interior of housing 12 are shown, but are not necessarily needed.

A switch means 20 is mounted on the top of housing 12 and contains a slide lever or any type of on/off switch 22 which can be used to switch into the reserve portion of battery 10. As depicted in FIG. 1, switch means 20 and on/off switch 22 could optionally be positioned remotely of battery 10, as shown by reference numerals 20A and 22a respectively.

FIG. 1 also depicts schematically various connections for certain elements. Negative terminal 16 would be connected to the "ground" side of the automobile circuitry.

Figure 4:
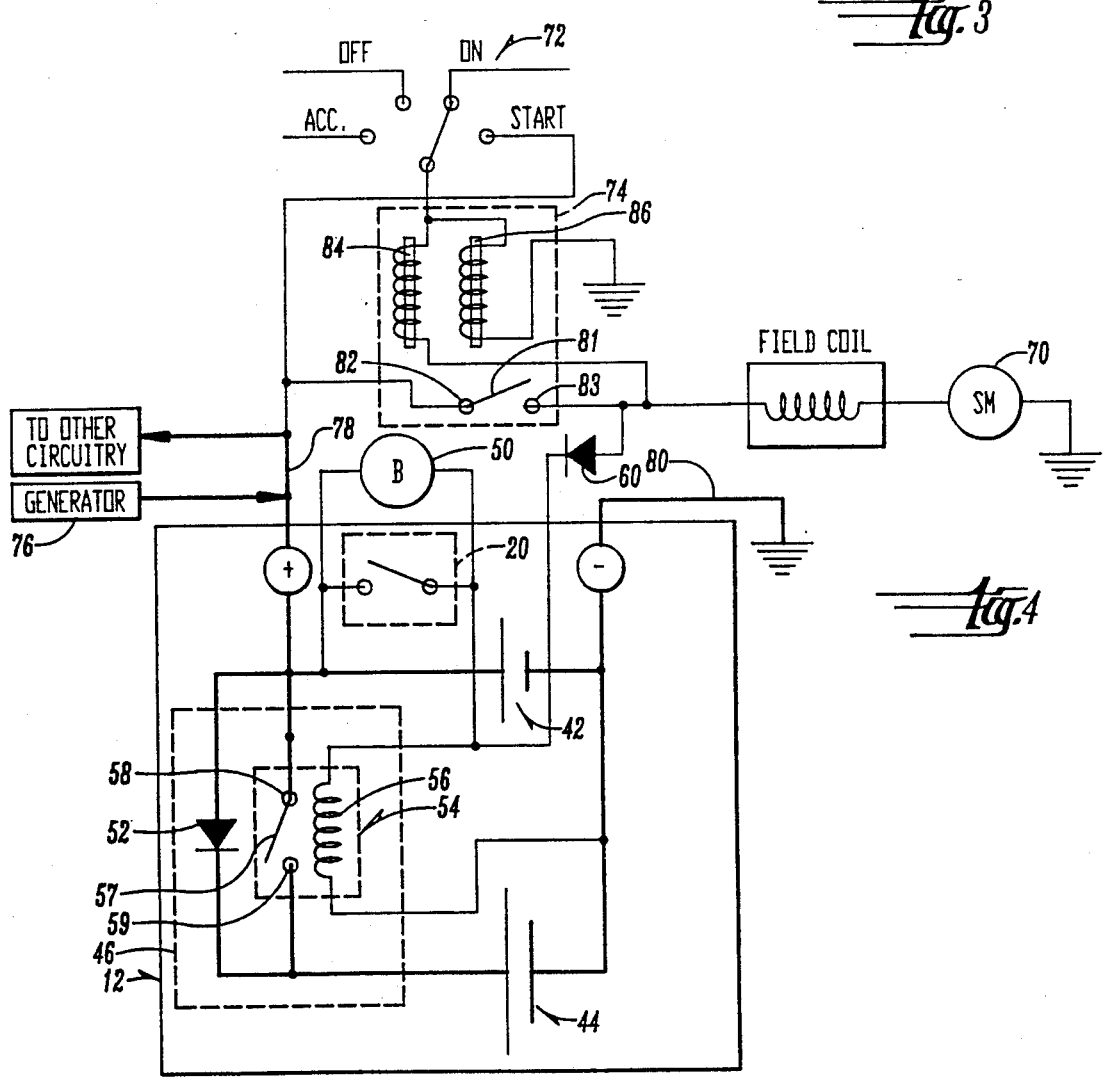
FIG. 4 is an electrical schematic of a preferred embodiment of electrical circuitry for the invention.

Positive terminal 14 would be connected to the positive side of the electrical automobile circuitry, and in particular, to the starter motor 70, ignition switch 72, starter solenoid 74, and generator or alternator 76 depicted schematically in FIG. 4. As is well known, other automobile circuitry also would be electrically connectable to battery 10, either switched or unswitched.

Thus, the embodiment of FIG. 1 can be installed exactly the same as a conventional automobile battery. It would fit in present battery mounting hardware and electrical connections would b simply accomplished by connecting conventional automobile wiring harness positive and negative terminal connections 78 and 80 to terminals 14 and 16 respectively. The correct connection of elements such as 70, 72, 74 and 76 would automatically be accomplished by the wiring harness, such as is well known.

Figure 2:
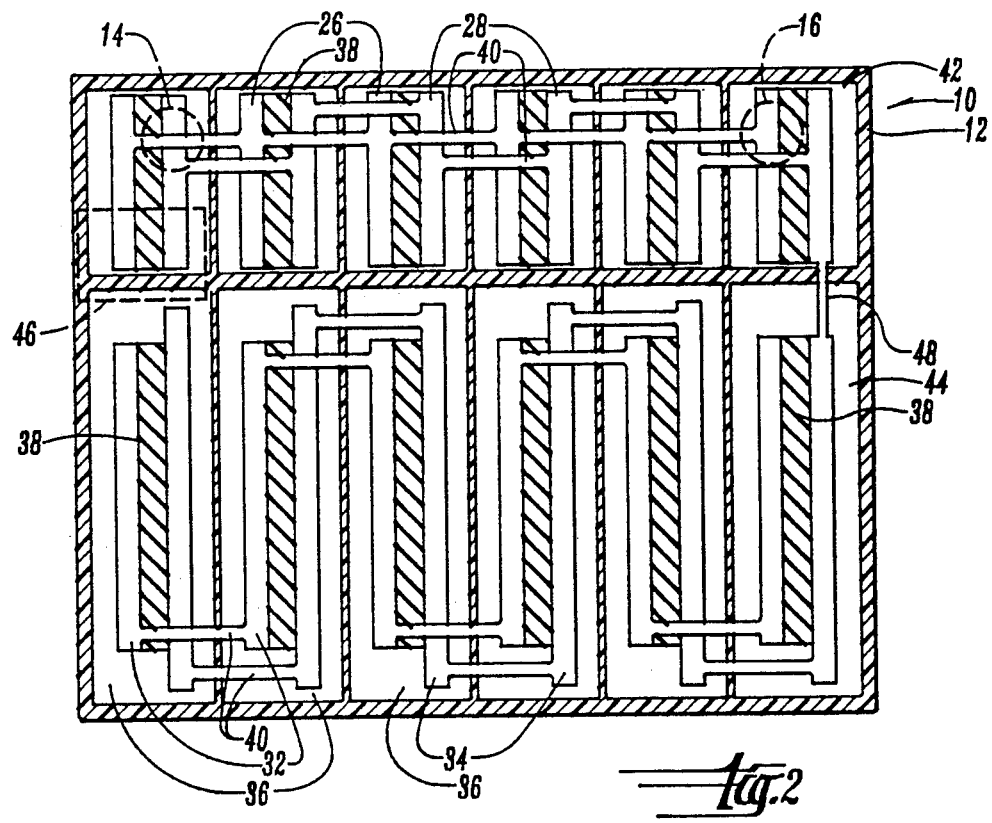
FIG. 2 is a cross section of the embodiment of FIG. 1 taken along lines 2—2 of FIG. 1.

FIG. 2 shows in cross section the interior of battery 10. Pairs of positive and negative plates 26 and 28 are contained within a series of six cells 30 in one portion of housing 12. Terminals 14 and 16 are positioned directly above the opposite end cells 30 in that series and are operatively connected to the appropriate set of positive or negative plates 26 and 28, respectively.

Pairs of somewhat larger positive and negative plates 32 and 34 are contained within a series of six somewhat larger cells 36, which comprises a majority of the interior of housing 12.

Insulation 38, such as is well known in the art, is mounted between each positive and negative plate within each cell. As is conventional in automobile batteries, each of the positive or negative plates are electrically connected by connections 40 with each succeeding positive or negative plate through each series of cells.

Therefore, the combination of cells 30 presents a smaller 12 volt direct current (d.c.) power source whereas the combination of cells 36 presents a somewhat larger 12 volt d.c. power source, both in terms of physical size and in magnitude of electrical power (or alternatively in amperage rating). The electrical power of combined cells 30 will be referred to as the primary power source 42 whereas the electrical power of combined cells 36 will be referred to as the reserve power source 44. As is well known in the art, the amount of electrical power is a function of a number of parameters. In the present preferred embodiments, the materials of the plates and insulation, as well as the type of electrolytic solution contained in each cell, are all the same or similar and therefore the electrical power of each power source 42 or 44 is determined primarily on the basis of the combined area of the pairs of the adjacent positive and negative plates in each cell.

Control circuitry 46 for this embodiment of the invention is indicated by the box formed by dashed line 46 in FIG. 2. This circuitry controls electrical connection between primary power source 42, reserve power source 44, and switch means 20 (or 20A) of FIG. 1.

As can be seen in FIG. 2, each series of cells 30 and 36 are essentially isolated and fluid tight with respect to one another. Of primary importance is the isolation of cells 36 from cells 30. However, an electrical connection 48 exists between negative plate 28 and negative plate 34 in the adjacent end cells 30 and 36 as shown in FIG. 2. There is no other connection between plates in either power source 42 or 44 in the normal condition of battery 10, and therefore there is no exchange or combination of electrical power between sources 42 and 44 in its normal state.

Figure 3:
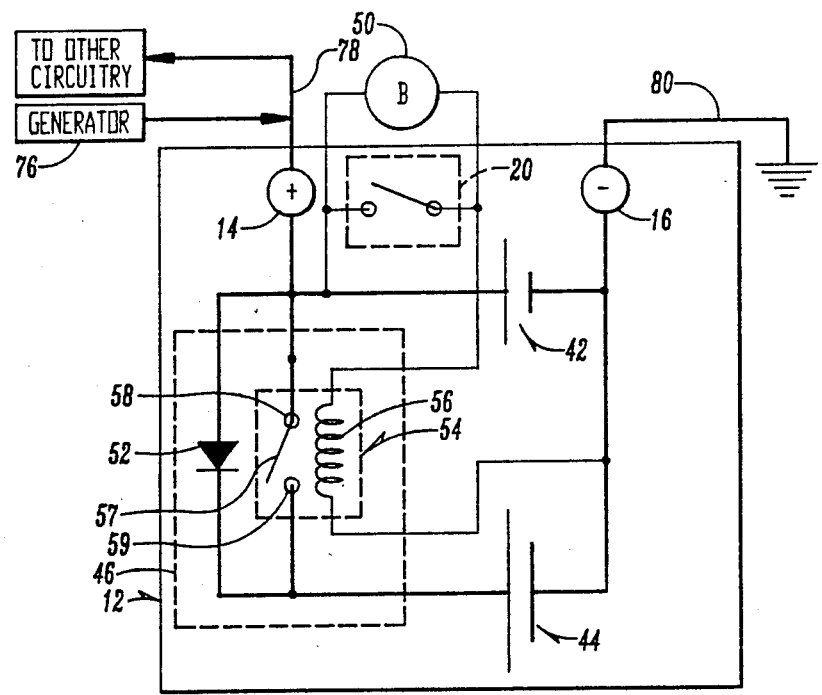
FIG. 3 is an electrical schematic of an embodiment of circuitry for the invention.

FIGS. 3 and 4 depict two alternative schematics for control circuitry 46 and switch means 20. Either alternative can be built into the battery 10, or can be connected together in other ways according to desire.

FIG. 3 presents a basic non-complex circuit according to the present invention. The circuitry serves to allow a user, when it is desired, to add in the electrical power of reserve power source 44 with that of primary power source 42 by manually moving switch 20 (or 20A) to a closed position. Until that is done, all electrical power delivered to the automobile electrical circuitry will be from primary power source 42. Switch means 20 is shown connected on one side to a positive terminal 14, and at the other side to the actuating coil 56 of normally open relay 54, which is there after connected to ground (i.e. negative terminal 16). Closing of switch 20 would energize coil 56 and close armature 59 of relay means 54 to connect contacts 58 and 59. This would join primary and reserve power sources in parallel until switch 20 is opened. A component 50, connected in parallel to switch means 20 could optionally be used as an indicator means which will give some signal (audible, visual, etc.) to the user when the switch means 20 is closed. Component 50 is preferred to be an audible buzzer, such as are known in the art.

Additional circuitry includes a diode means 52 connected in parallel to armature 57 and contacts 58, 59. Diode means 52, as shown, blocks and prevents any electrical current from the reserve power source 44 to combine with primary power source 32 or pass out of positive terminal 14 when switch means 20 is open. It does allow, however, for electrical power to pass from the automobile recharging component (generator or alternator) into reserve power source 44 (as well as primary power source 42). Therefore, both power sources 42 and 44 will be constantly recharged when the automobile recharging means is operating, regardless of whether switch means 20 is open or closed. However, the reserve source will not have an electrical path to discharge its power when contacts 58 and 59 are not connected by relay armature 47.

In this straightforward form, primary power source 42 will be connected to the automobile circuitry and will provide only its proportionate share of available electrical power to the car's circuitry, until switch means 20 is closed. At that time, whether by utilizing a manual switch means 20, or remote switch means 20A, or some automatic or semiautomatic actuator controlling switch means 20, primary and reserve power sources 42 and 44 would be connected in parallel and provide combined or 100% of the available power contained within housing 12 to the automobile circuitry.

Therefore, sources 42 and 44 could be combined at any time desired to use the combined power of sources 42 and 44. If, however, primary power source 42 is discharged or otherwise weakened so that it does not adequately supply needed power to the automobile circuitry, switch means 20 would simply be closed and the proportional amperage of reserve power source 44 (at least 50% of the combined amperage) would then be available to the automobile circuitry.

It is to be understood that an important aspect of the present invention are the relative sizes of power sources 42 and 44. Normally, required electrical power to an automobile electrical circuit during operation under power of the engine is minimal compared with that many times needed when starting the car. Therefore, primary power source 42 does not normally have to be as big as a conventional battery to sustain the electrical power needs of a car. It is only when extraordinary events occur such as cold weather, weakening or discharge of the primary power source, or an extraordinary need for electrical power (as with starting the car), that primary power source 42 may be insufficient.

In cold weather, for example, any battery would be substantially weakened regardless of whether it has been used or not. Therefore, it was discovered that by apportioning the primary and reserve power sources 42 and 44 so that source 42 is equal to or smaller than 44, most normal operating conditions for an automobile could be handled by source 42 leaving a very substantial unaffected reserve source 44 always available.

The prior art attempted to overcome this problem by either looking to connection of two full sized batteries in parallel, and therefore not having to concern themselves with size considerations; or by having a small portion of a conventionally sized battery taken up by the reserve power source, as the amount of electrical power is limited according to the size of the housing. This of course decreases the power of the primary battery source proportionately. These attempted solutions still, however, maintain a primary source which is substantially bigger than the reserve source.

The present invention teaches away from either of these directions by utilizing a primary power source which is never bigger than the reserve source. This provides a substantially larger reserve power source to be formed in a conventionally sized housing, than has been previously taught.

While others have believed that one needed only to carry a very small auxiliary reserve source to be effective, such a reserve had deficiencies that did not allow it to be a totally reliable backup.

While those types of systems might work in optimum conditions (mild weather, excellent electrical contact to terminals, etc.), in extreme conditions, that is, worst-case scenarios such as very cold weather or bad terminal connections, a small amperage reserve source many times will not be sufficient.

The present invention solves this problem by realizing that the reserve portion must have sufficient power over a range of situations. Limitations of size of the battery housing, and therefore the plate sizes of the primary and reserve sources, required a novel solution that can be seen in the preferred embodiments.

FIG. 4 depicts a preferred control circuitry and switch means circuitry which can be used with the invention. It is similar to that shown in FIG. 3, except it presents an alternative way to control relay means 54, in addition to switch means 20, to connect primary and reserve power sources 44 and 42. The circuitry of FIG. 4 operates as follows. The coil 56 of relay means 54 is additionally connected to the starter solenoid 74 of the automobile. When solenoid 74 is energized, coils 84, 86 close armature 81 and normally open contacts 82, 83 which provide electrical power to starter motor 70. The closing of contacts 82, 83 would also provide electrical power to coil 56, closing contacts 58, 59 and therefore connecting primary and reserve power sources 42 and 44. In conventional automobile systems, solenoid 74 is only energized when ignition switch 72 is turned to ignition "start" position (as opposed to the other conventional ignition switch positions of "off", "acc" (accessory), and "off"), providing electrical power to coils 84 and 86 of solenoid 74. Therefore, the embodiment of figure provides an automatic way to always combine primary and reserve sources 42 and 44 of battery 10 every time the vehicle is started. This assumes, of course, that manual switch 20 is in the normally open position. It is to be understood that the connection between solenoid 74 and coil 56 of relay 54 is preferred because of easy connection to the terminal of solenoid 74, but this lead can also be connected to any circuit that is actuated when ignition switch 72 is in the "start" position.

This embodiment provides the valuable advantage of always, without throwing any switch, having 100% total combined power of battery 10 each time the vehicle is started, and then automatically returning to use of only the primary power source when running (ignition switch in "on" position); or not running (ignition switch in "off" or "acc" positions). As is known in the art, accessories can be used while draining only the primary source, even if the car is not running, if the ignition key is turned only to "accessory" position (or "on" position also). It is only when the solenoid actually engages the starter motor that the full battery power is used. Once the solenoid kicks out, however, such as is known in the art, relay means 54 would be deenergized and the system would automatically revert back to the primary power source 42.

It is to be understood that switch 20 can still be used.

When switch means 20 is open, no electrical power is conducted through coil 56 of relay means 54 thereby leaving contacts 58, 59 in their normally open position. When switch means 20 is closed, however, coil 56 is energized pulling armature 57 from normally open to a closed position bridging contacts 58, 59. In the closed position, primary and reserve power sources 42 and 44 are connected.

As can be seen, FIG. 4 can also include component 50 which signals when switch 20 is closed. Component 50 is valuable in notifying the user that the reserve power source 44 is being constantly utilized. Therefore, it assists in reminding the user to switch the system back to the primary source 42 (with automatic starting operation) unless reserve power source 44 continues to be needed.

In the preferred embodiment, primary power source 42 has approximately 35% of the electrical power of reserve power source 44, which would have 65% approximately of the power of battery 10. If battery 10 had an 800 amp rating of available electrical power for both sources 42 and 44 total, primary power source 42 would therefore have a 280 amp with reserve power source 44 having a 520 amp rating. This should be more than enough for most situations with respect to needs of the primary source 42, and backup reserve for even extreme or worst-case situations. It is to be understood, however, that while 35%-65% is the preferred ratio between primary and reserve sources 42 and 44, the invention achieves its advantages and objectives when source 44 is approximately as big or bigger than source 42. A range of ratios between 50—50 and 10-90 for primary and reserve sources 42 and 44 respectively would be acceptable. It is preferred that primary source 42 have at least 200-250 amps.

For a primary source 42 having 210 amps, and a reserve source 44 having 210 amps, diode means 52 could be a 30 amp diode available from any number of electrical component dealers. Switch means 20 could be any standard on/off switch that can handle the power requirements of the circuitry. Relay means 54 can be a 15 amp relay. The connections between switch means 20 and/or relay means 54, diode means 52 and component 50, as well as from battery 10 to the automobile circuitry can be wiring such as is conventional and well within the skill of those of ordinary skill in the art. The wiring through diode 52, contact 58, and between primary and reserve sources 42 and 44 should be heavy gauge wire because this path will carry significant current. Connections to coil 56 and switch 20 can be lighter gauge. These ratings can vary, of course, with different power ratings.

It will be appreciated that the present invention can take many forms and embodiments. The true essence and spirit of this invention are defined in the appended claims, and it is not intended that the embodiment of the invention presented herein should limit the scope thereof.

For example, the exact proportional relationship of the electrical power contained in primary power source 42 and reserve power source 44 can vary. At a minimum, the power of power source 42 should be equal to or less than that of reserve power source 44, and preferably between 10 and 50 percent of any combination of power of sources 42 and 44.

Still further, the invention could include options such as voltage or current monitors which would automatically energize or switch to incorporating the reserve power source 44 if the level of voltage or current enters a certain range.

Still further, electrical connections, such as are well known in the art, could be utilized to allow a plug-in remote switch to be placed inside the passenger compartment of the automobile, or to allow auxiliary electrical components to be plugged into the reserve power source 44. It has been found that utilizing battery 10, if audio equipment is directly connected to reserve power source 44, a substantial amount of interference caused by operation of the automobile engine can be filtered out.

Still further, it is to be understood that a diode means 60 (30 amp) could be placed in line from the starter solenoid 74 to the coil 56 of relay means 54 in the embodiment of FIG. 4 to prevent current from flowing to that circuitry and discharging any part of battery 10; while allowing current to come from the ignition circuitry for the purposes explained above. The system can be designed to operate properly without this diode 60, however, but would depend on the type of switch and relay used.

Also, switch 20 and diode 60 may not be needed if relay 54 had a manual override switch incorporated into it to close contacts 58, 59.

The present invention is relevant to 12 volt direct current automobile batteries and electrical systems. However, it is also applicable to the 6 volt systems, and other battery uses analogous to automobiles, such as any equipment powered by internal combustion engines or any system that requires a storage battery for some necessary function.

What is claimed is:

1. A method for providing constantly available reserve battery power comprising:

installing a primary battery means and a reserve battery means into a housing, the primary battery means no more than approximately equal electrical power to the reserve battery means;

connecting the primary battery means to the electrical system of an automobile in a normal mode of operation, the electrical system including but not limited to a starter motor means, a starter solenoid means, and an ignition switch means;

connecting the reserve battery means in parallel to the primary battery means when desired to increase the total electrical battery power;

charging the primary and reserve battery means together; and prohibiting discharge of the reserve battery means during charging.

2. A battery means comprising:

a first battery including connection terminals;

a second battery of at least of approximately equal electrical power as the first battery; and a switch means to connect the second battery to the first battery in parallel, the switch means including a relay means.

3. A battery means comprising:

a first battery including connection terminals;

a second battery of at least of approximately equal electrical power as the first battery; and a switch means to connect the second battery to the first battery in parallel, the switch means being located remotely from the housing.

4. The means of claim 2 wherein the relay means is connectable to the ignition circuit for an automobile.

5. The means of claim 2 wherein the relay means is operated by a manual switch means.

6. The means of claim 2 wherein the relay means operates only when the ignition circuit is actuated and the ignition key is turned to the "ignition" position.

7. A battery means comprising:

a first battery including connection terminals;

as second battery of at least of approximately equal electrical power as the first battery;

a switch means to connect the second battery to the first battery in parallel; and an auxiliary electrical connection associated with the second battery means for powering auxiliary devices, the electrical connection being adaptable for use with audio means, whereby the auxiliary connection reduces interference caused by automobile engine noise for the audio means.

8. A battery means comprising:

a first battery including connection terminals; a second battery o at least of approximately equal electrical power as the first battery;

a switch means to connect the second battery to the first battery in parallel; and an electrical connection means for connecting a remote switch means.

9. A battery means comprising:

a first battery including connection terminals;

a second battery of at least of approximately equal electrical power as the first battery;

a switch means to connect the second battery to the first battery in parallel; and an automatic shut-off means for switching to the second battery means upon detection of a minimum voltage or current.

* * * * *